Oct. 25, 1960 T. A. BANNING, JR 2,957,964
CLUTCHES AND THE LIKE
Original Filed April 21, 1955 4 Sheets-Sheet 1

INVENTOR.
Thomas A. Banning, Jr.,
BY

Oct. 25, 1960  T. A. BANNING, JR  2,957,964
CLUTCHES AND THE LIKE
Original Filed April 21, 1955  4 Sheets-Sheet 4

INVENTOR.
Thomas A. Banning, Jr.,
BY

United States Patent Office

2,957,964
Patented Oct. 25, 1960

2,957,964

CLUTCHES AND THE LIKE

Thomas A. Banning, Jr., 5520 South Shore Drive, Chicago, Ill.

Original application Apr. 21, 1955, Ser. No. 502,947, now Patent No. 2,856,692, dated Oct. 21, 1958. Divided and this application Oct. 15, 1958, Ser. No. 767,396

7 Claims. (Cl. 200—98)

This invention relates to improvements in clutches, and the like. By this term I mean devices by which two adjoining shafts or other rotary elements may be connected together for drive of the one by the other, or may be disconnected from each other so that the driving element may rotate in either direction without transmission of rotary drive to the other or driven element. In the former case of effecting drive from the driving element to the driven element the two elements are "clutched" together; in the latter case of discontinuing drive from the driving element to the driven element the two elements are "unclutched" from each other. Numerous forms of clutches have been developed, generally to meet specific conditions of operation imposed by the form and intended use of the machine wherein they are included.

Primarily the clutch construction herein disclosed is intended for use in instrumentation units wherein very close tolerances of accuracy of measurements of angular rotations are a requirement. Thus, in measurements of distance by integration of successive relatively small increments of the total distance, with intervening distance elements which are not to be included in the totalizing of the numerous increments, it is evident that even slight losses of measurement or slight unintended additions of distance to the integration of the intended increments, will produce serious over-all errors of integration. Such errors may and in various kinds of operations will be sufficient to make the entire measuring operation worthless.

The herein disclosed clutch construction is one in which the clutching and unclutching operations are produced by direct movement of a driving anad driven element towards and from each other. The engaging surfaces of these elements are friction annuluses having their planar surfaces normal to the axis of rotation. It is evident that the torque transmitting ability from driving to driven element is limited by the diameters of the contacting surfaces, the conditions of the contacting surfaces, the materials from which such surfaces are formed, and the pressure produced between the contacting surfaces. In this arrangement provision must be made for producing continuity of such engagement between the driving and driven surfaces at the needed pressure. When such engagement is produced by direct magnetic pull exerted between the elements, and when such magnetic pull is developed by a solenoid electrically energized, it is generally necessary to retain current on the magnetizing coil or coils during the interval of engagement, sometimes for long periods of time.

It is an object of the present invention to make provision for retaining the companion elements in driving engagement with each other, once that engagement has been instituted, by magnetic means, either with or without supplementary spring urged engagement producing means, and without the need of supplying current to the magnetizing coils except for a very short interval during which the engagement is being produced. That is, this feature of the invention concerns itself with the provision of current produced magnetization to institute the engagement between the driving and driven elements, together with supplemental magnetic means to retain the driving and driven elements in driving engagement with each other until a contrary disengaging force is produced electromagnetically. Thereupon such "holding" magnetic force is broken and the disengagement occurs.

The supplemental magnetic means referred to in the preceding paragraph is conveniently in the form of permanent magnet elements which are connected to the movable driving or driven element and are adapted to come into magnetic holding engagement with stationary abutment elements when the clutching or unclutching movements occur. Thus once such permanent magnet elements have thus engaged such abutments the desired holding force is produced, and it is not then necessary to maintain the current supply for the electromagnets, and such current supply may then be discontinued until a contrary shift of the driving or driven element is to occur. Thereupon another electromagnetic releasing force is produced by which the engagement of such permanent magnet element is broken, and the engagement between the driving and driven elements is terminated. Thus, only a short impulse of current is required to produce the engagement (or disengagement) of the driving and driven elements with (or from) each other. Thus the numerous clutching and unclutching operations are produced without need of maintaining current on a magnetizing coil during the long intervals which may interpose between successive engagements and disengagements of the driving and driven elements, with or from each other.

It is a further object of the invention to provide a clutch unit wherein similar operations are employed for producing the disengaging operations of the driving and driven elements so that it is not necessary to retain current on any magnetizing coil for more than a very short interval of time.

A further feature of the invention relates to provision of a clutch unit of the foregoing type wherein, when the driving and driven elements are disengaged from each other the driven element will be immediately locked securely against rotation until a subsequent clutching impulse or signal arrives to produce such clutching action. According to the structure which is provided to accomplish this purpose, I have provided an element which is drivingly connected with the output or driven shaft and is axially shiftable a slight distance axially between the driving and driven shaft locations. The driving shaft carries a friction disk element lying in a plane normal to the axis of rotation, and there is a stationary element located near the driven shaft location and provided with another stationary friction disk element also lying in a plane normal to the axis of rotation. The axially shiftable element is provided with faces on its opposite ends, which faces are also normal to the axis of rotation. By shifting such element in the clutching direction the face of one of its ends is engaged with the face of the driving friction disk element to produce drive; by shifting such element in the unclutching and braking direction the above mentioned face is disengaged from the face of the driving disk, and the face on its other end is engaged with the stationary friction disk element to produce a braking action. The amount of shift needed to effect clutching from unclutched and braked condition, or vice versa, is very small, of the order of one or a few thousandths of an inch.

In connection with such axially shiftable element I have provided very simple and effective shifting means which incorporates the features hereinbefore explained. The arrangement is such that a very substantial multiplication of force is produced from that exerted by the actuating and holding magnets, to such axially shiftable element. Thus the actual frictional engagement of the axially shiftable element with either the driving element or the brake element is substantial and much larger than the originating force.

This shifting means includes a force originating element which includes a pendulum-like downwardly extending arm to which are connected the armature and permanent magnet elements by which such arm is swung in the one direction or the other by properly located solenoids carried by the base plate. This arm carries suitable electrical contacts by which the incoming current impulses are delivered to the one solenoid or the other, and which contacts break engagement with companion stationary contacts shortly prior to completion of the shift in the one direction or the other. Thus each shift of the axially movable element is produced by a short impulse, with discontinuation of current supply at or shortly prior to the completion of the shifting movement.

It is a further feature of the invention to provide adjustable means whereby the permanent magnet elements may be adjusted after the unit has been assembled, so as to bring them into correct functioning position with respect to the pendulum-like arm. These adjustment means include means to adjust the permanent magnets towards and away from the pendulum-like arm.

It is a further object of the invention to provide spring means to effect additional frictional engagement of the axially shiftable element with either the driving element or the brake element. Such spring means is so arranged and connected to other elements of the device that a toggle effect is produced acting to develop spring originated force in either the driving element direction or the braking element direction, with passage of the spring effect through a force reversing location in accordance with the action of conventional toggle actions. The arrangement is such that the spring force developed by this supplemental element may be adjusted without disturbance to other elements of the device. Such spring toggle force acts to supplement the holding force developed by the permanent magnets when the shiftable element reaches either terminus of its movement.

Other objects of the invention are to provide a very compact and well ordered arrangement of the essential parts, to produce a rugged and durable device, to produce a very quick acting clutch, and to produce an arrangement of simple construction which will not readily get out of order. Also, to produce a clutch unit having a strong specific holding power, that is, a large holding power per unit weight of the device, with corresponding high specific torque transmitting ability. Also, to produce a clutch unit which can be built at low cost, from parts readily produced by conventional shop practices, and with comparatively small labor needed for assembly.

Other objects and uses of the invention will appear from a detailed description of the same, which consists in the features of construction and combinations of parts hereinafter described and claimed.

This application is a division of my co-pending application for Letters Patent of the United States for improvements in Measuring and Recording Various Well Drilling Operations, Serial No. 502,947, which became Letters Patent No. 2,856,692, issued October 21, 1958.

Figure 1:
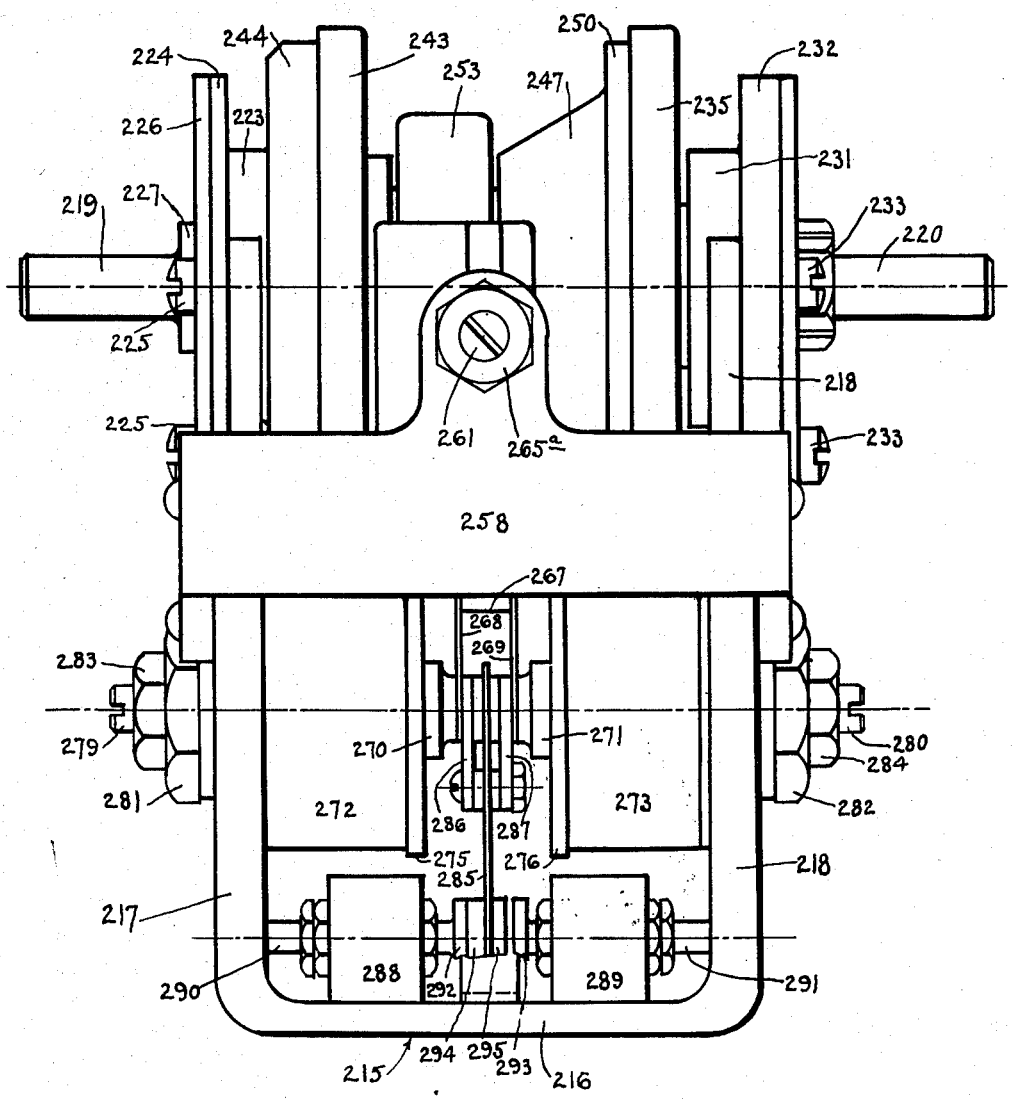
Figure 1 shows a front elevational view of the clutch embodying the features of the present invention.
Figure 2:
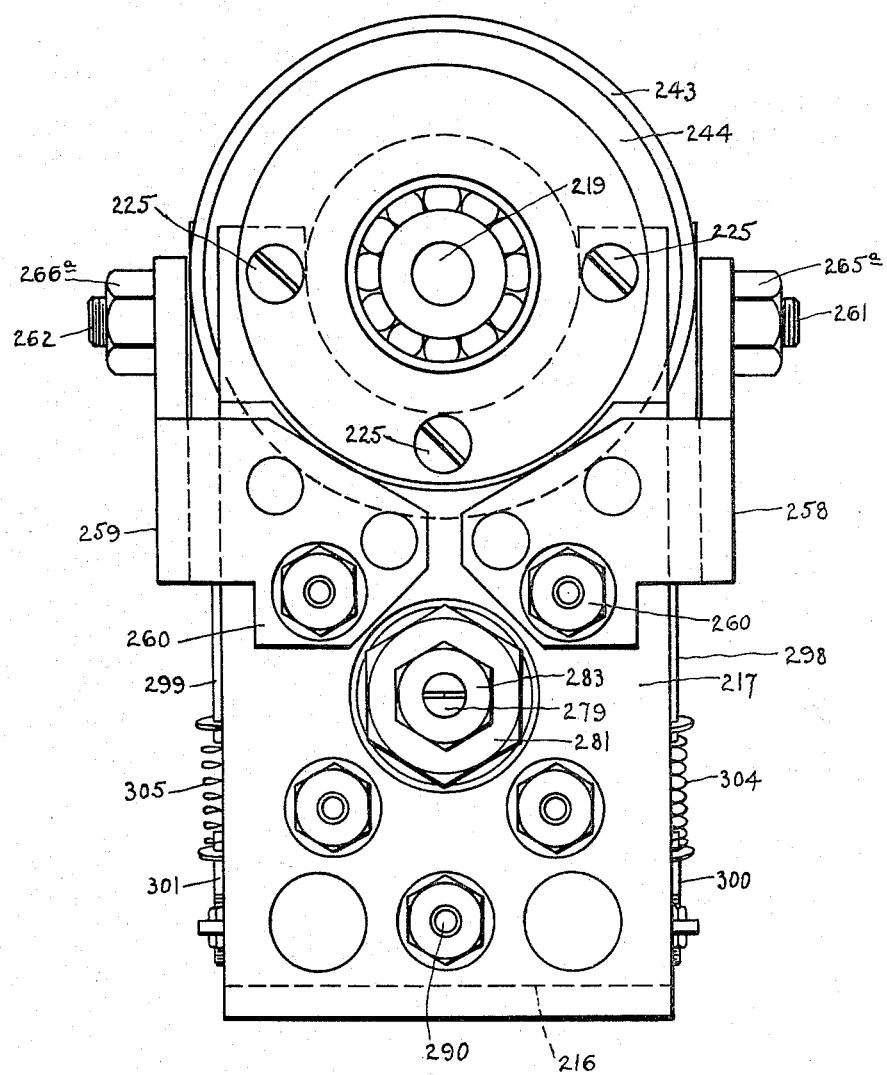
Figure 2 shows an end view of the clutch illustrated in Figure 1, looking at the left-hand end of such clutch.
Figure 3:
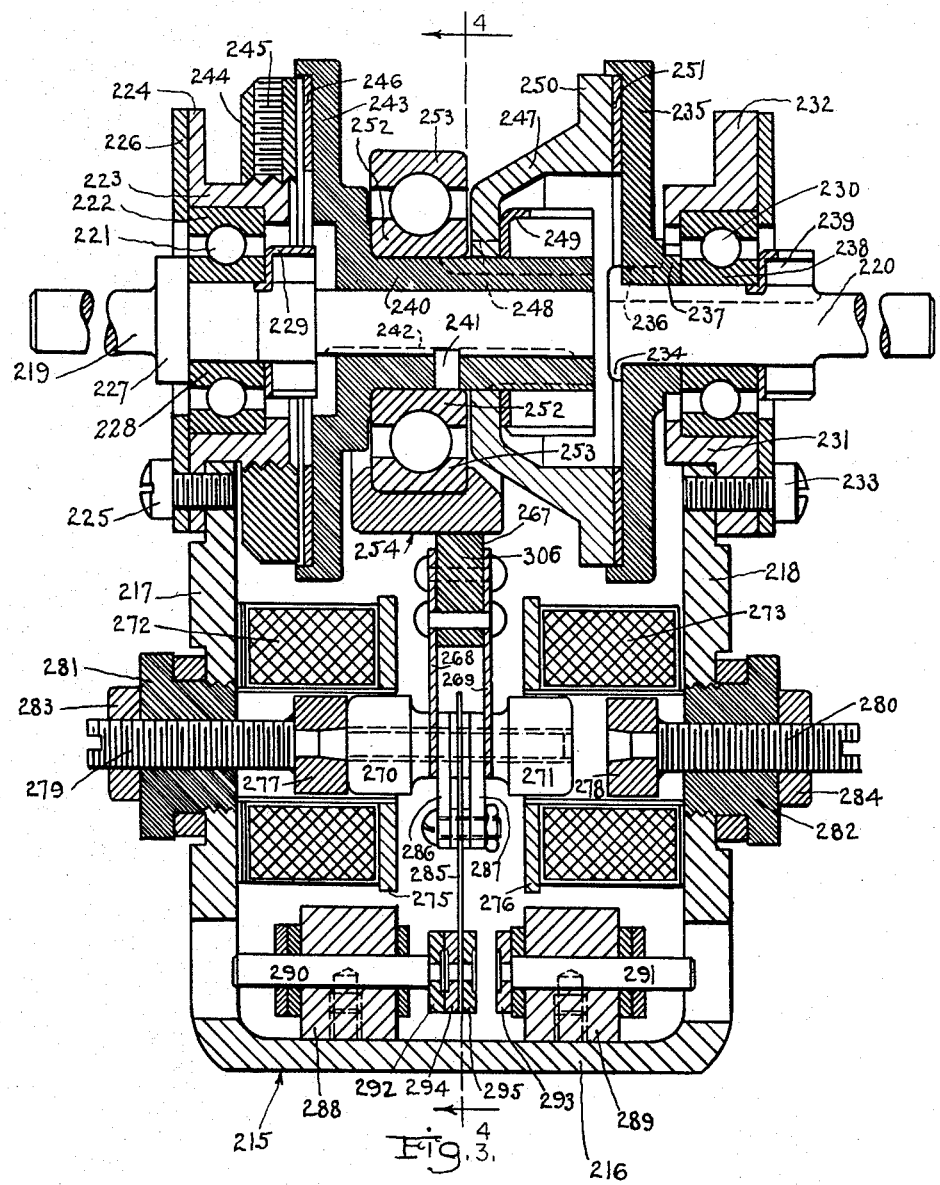
Figure 4:
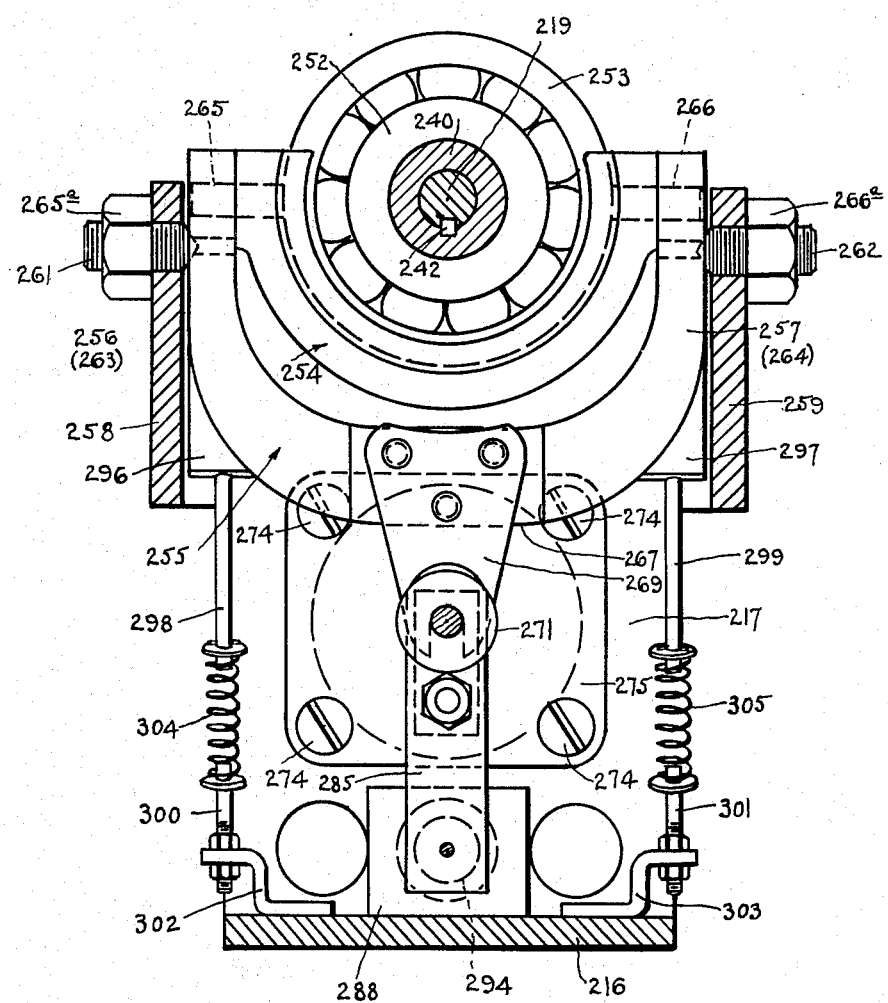

Figure 3 shows a longitudinal section through the clutch design shown in Figures 1 and 2, the shifter element being shown in its right-hand moved or driving position, the braking element being disengaged to permit rotation of the said element and thus to also permit rotation of the driven shaft; and in this figure the permanent magnet, such as an Alnico magnet, at the left-hand side of the unit is shown in engagement with the stationary "armature" to which it magnetically locks at conclusion of shift in the direction to carry such permanent magnet into engagement with such armature, so that the clutch will be retained in its thus shifted position without need of continued energization of the shifting magnet; and Figure 4 shows a cross-section taken on the line 4—4 of Figure 3, looking in the direction of the arrows; and this figure shows that the shifter yoke by which the clutching element is shifted back and forth is itself pivoted to the operating yoke for rock about an axis above the axis on which the operating yoke rocks, to thus produce a strong shifting action on the shifter yoke by exertion of a much larger shifting force on the operating yoke; and in this figure I have also shown the supplementary spring toggle element by which the holding actions in either direction of shift are augmented.

Figures 1, 2, 3 and 4 show in detail and on enlarged scale as compared to an actual unit the construction of this "permanent magnet" (Alnico) type of clutch. This unit includes the U-shaped frame element 215 having the base portion 216 which sets directly on the plate 67, and also includes the upwardly extending bracket arms 217 and 218. The driven shaft 219 extends from the left-hand side of the unit to a location between the bracket arms, and the driving shaft 220 extends from the right side of the unit to a location between the bracket arms, and to proximity to the end of the driven shaft. These two shafts are accurately aligned with each other. The driven shaft is supported and journalled by the ball bearing 221 having its outer raceway 222 seated into a collar element 223 which is set down into a semi-circular recess on the top edge of the bracket arm 217. This collar element is provided with the outwardly extending flange 224 which bears against the outer face of the bracket arm and is secured thereto by the screws 225. A bearing retainer ring 226 is also clamped against the outer end of the outer raceway 222 by these screws. The driven shaft is provided with the flange 227 which engages the inner raceway of the ball bearing, 228, to limit the inward movement of said shaft; and a cup-shaped element 229 is set onto the shaft just to the inside end of the inner raceway to fix the shaft against outward withdrawing movement through the bearing.

The driving shaft 220 is journalled in the ball bearing 230 seated in a suitable opening of the right-hand portion of the unit. To this effect the outer raceway of this ball-bearing is seated into the collar elements 231 with its outer raceway carried by such collar element in manner similar to the construction shown for the bearing of the driven shaft. This collar element is therefore set down into a semi-circular recess formed in the top edge of the bracket arm 218, and the flange 232 of this collar element sets directly against the outer face of the bracket arm 218 to which it is secured by the screws 233. The inner end of the driving shaft is enlarged as shown at 234 to establish an abutment. The disk element 235 is then set onto the inner end of the shaft and against this abutment; and a key lug 236 of the shaft engages a suitable slot of the disk to key the disk to the driving shaft. Thus the disk and driving shaft are rotatably connected together.

The disk 235 is provided with a rightwardly extending neck 237 which engages the inner end of the inner raceway 238 of the bearing 230, and a cup-shaped element 239 engages the outer end of the said inner raceway to retain the shaft properly against inward shift through the ball bearing.

The sleeve 240 is splined onto the driven shaft by engagement of the pin 241 which extends through such sleeve into engagement with the axially extending keyway 242 of the shaft. Although only a small shifting movement of the sleeve on the shaft is to be executed, as will presently appear, still the sleeve is made of ample length as shown in Figure 3 to ensure accurate operation of the sleeve during its shift on the shaft. The left-hand end portion of this sleeve is provided with the outwardly extending flange 243 of considerable diameter and facial bearing surface. A ring plate 244 is set onto the inner end portion of the collar element 223, preferably by a threading arrangement as shown, so that by turning this ring plate its inside face may be advanced towards or retreated from the position of the flange (when said flange is in one of its two intended positions of operation). A set screw 245 is extended radially inwards through the ring plate and into locking engagement with the collar element to lock said ring plate in its adjusted position.

Preferably the flange 243 is of slightly greater diameter than the ring plate and is slightly recessed in its outer face to receive the ring plate 244 during one intended operation. A facing of brake lining or other friction material 246 is cemented or otherwise adhered to the face of the flange 243, such facing being of ring shape as evident from Figure 3. The flange 243 is accurately formed and set onto the driven shaft so that the plane of such friction material face is normal to the axis of rotation, and likewise the ring plate 244 has it right-hand face normal to the axis of rotation. The parts are accurately made so that when the sleeve 240 is shifted leftwardly a small distance an even engagement of the friction material (and element 243) occurs with the ring plate to lock the parts, including the driven shaft, against rotation.

The sleeve 240 also carries a cup-shaped element 247 which is drivingly connected to such sleeve by the key and keyway shown at 248; and a cup element 249 is set onto the shaft to the right of the concave inner face of such element 247 to retain such element in place. This cup element is provided with the peripheral flange portion 250 providing an annular or ring shaped portion facing the disk element 235. Said disk element is preferably of slightly larger diameter than said flange 250 and is facially recessed slightly to accommodate the flange 250 during one intended operation. A ring of brake lining or other friction material 251 is cemented or otherwise secured to the face of the disk element 235; and the parts are accurately formed with surfaces lying in planes normal to the axis of rotation.

The proximate portions of the cup-shaped element 247 and the flange 243 are so spaced and formed as to provide space to accommodate a shifter element, presently to be described. It is here noted, however, that when the sleeve 240 is shifted rightwardly into the position shown in Figure 3 the flange element 250 is brought into driving engagement with the disk element 235 so that drive from the shaft 220 to the shaft 219 is effected. On the other hand, by a slight shift leftwardly the flange 250 will be withdrawn from engagement with the disk element to discontinue drive from the shaft 220 to the shaft 219, and immediately thereafter the flange 243 will be brought into frictional engagement with the ring plate 244 which is stationary, thus locking the sleeve 240 stationary also. Since the shaft 219 is drivingly connected to such sleeve it follows that said shaft will also be thus locked stationary at such time.

The clearance between the shifting faces of the flange 250 and the friction material carried by the flange 243 are such that only a slight shift of the sleeve is needed to effect the change from the driving of the shaft 219 to the locking of said shaft stationary. I shall now describe the shifting means to produce these effects:

A ring 252 is seated on the sleeve 240. This ring conveniently comprises the inner raceway of a ball bearing of which the outer raceway is shown at 253. A semicircular yoke element 254 is provided (see Figures 3 and 4), such yoke being provided with an upwardly facing semi-circular recess to receive the lower half of the ring 252. The flange 243 and the cup shaped element 247 are both so formed that shift of the ring 252 in the one direction or the other will produce engagement of such ring with such element 243 or 247 as the case may be, without engagement of the outer raceway 253 with such element 243 or 247. But the ring 253 is engaged by the yoke member. Consequently rotation of the sleeve and the inner ring 252 or inner raceway of the ball bearing may freely occur substantially without friction since the outer raceway of the ball bearing may remain non-operative, being seated into the yoke. Thus the back and forth shifts of the yoke are effected carrying with such yoke the sleeve and its engaging surfaces.

There is another actuating yoke 255 of larger span than the yoke 254 and extending below and up at the sides of the yoke 254 (see Figure 4). The arms 256 and 257 of this larger yoke embrace the yoke 254 between them, and the depth of the yoke 255 is sufficient to permit free relative movement between the two yokes. U-shaped horizontal bars 258 and 259 are set against the front and back edges of the bracket arms 217 and 218, and secured to said bracket arms by the screws 260 as indicated in Figure 2. Thus a rigid frame is provided; and additionally said bars extend up far enough to provide supports for the yoke 255 as follows:

The pivot pins 261 and 262 are extended through the bars 258 and 259 respectively, the inner ends of such pins being tapered to fit into corresponding tapered recesses in the two arms 263 and 264 of said yoke 255. Lock nuts 265a and 266a are set onto these pivot pins for the self-evident purpose. Examination of Figure 4 will show that the horizontal plane which includes the shafts 219 and 220 lies above the horizontal plane which includes the pins 261 and 262. The upper portions of the opposite sides of the yoke 254 are pivotally connected to the arms 263 and 264 of the yoke 255 by the pins 265 and 266 which lie in the horizontal plane which includes the two shafts 219 and 220. It will now be apparent that rock of the yoke 255 about its axis of support will result in a slight shift of the axis extending through the two pins 265 and 266, in direction opposite to that in which the lower portion of the yoke 255 is shifted. Since the yoke 254 is connected to the yoke 255 by the pins 265 and 266 such yoke 254 is allowed to shift directly in one direction or the other while remaining parallel to itself during such shifts, that is, remaining within a plane normal to the axis of the shafts 219 and 220. Due to the fact that during such a shift the pins 265 and 266 will travel parallel to themselves and within a cylindrical surface of which the axis is coincident with the axis passing through the two pins 261 and 262, it follows that such rock of the yoke will produce a very slight vertical component of motion of the yoke 254. However, due to the slight angular shift which will be executed by the yoke 255 and the small distance between the pins 262 and 266 (and 261 and 265) it follows that no appreciable vertical component of motion will be produced, such as above suggested. Any slight vertical component of movement may be accommodated by slight clearances between the parts.

It is now evident that rock of the lower portion 267 of the yoke 255 will serve to produce the desired shifts of the sleeve 240 and connected parts, such sleeve shifts being in direction opposite to that of movement of the lower portion 267 of the yoke. It is also evident that such an arrangement will produce a large multiplication of force as between that applied to the yoke portion 267 (and the extension thereof, 269) and that produced at the braking or driving position of the sleeve elements. This fact is evident from the fact that the distance between the pins 262 and 266 is several times smaller than the radius of swing of the yoke extension 269. It is thus possible to produce the desired gripping forces between surfaces by use of comparatively small forces applied to the yoke extension 269. The yoke shifting and holding means is as follows:

Referring to Figure 3, the plates 268 and 269 are secured to the opposite faces of the yoke portion 267. These plates are separated from each other and produce a slightly stiff but yieldable downward extension of the yoke portion 267. Blocks of magnetic material, 270 and 271 are secured to the lower end portion of this downward extension. Thus the yoke may be shifted back and forth by production of proper magnetic fields to influence and act on such blocks. The strong solenoids 272 and 273 are set against the inside faces of the arms 217 and 218 and are clamped in such positions by screws 274 passed through retainer plates 275 and 276 as shown in Figure 4. These solenoids are of the air-core type in the sense that they are not provided with conventional magnetic material cores. However, blocks of strongly magnetized high permeability and high retentivity material, such as "Alnico" metal, are located and secured within the air core spaces of these solenoids. These are the blocks 277 and 278 secured to the inner ends of the screws 279 and 280. These screws are threaded through the screw plugs 281 and 282 of large enough size to allow the Alnico blocks to be inserted into place when such plugs are removed; and lock nuts 283 and 284 are threaded onto the projecting ends of the screws as shown in Figure 3. By this arrangement it is possible to adjust each Alnico block to exact position within the air core of its corresponding solenoid.

With this arrangement the following operations are possible:

Assuming that the yoke has been shifted to one extreme position, as shown in Figure 3, the block 270 of magnetizable material has been magnetically gripped by the Alnico block 277; and at the same time a considerable air gap exists between the block of magnetizable material 271 and the Alnico block 278. Accordingly, a strong holding force is being exerted to retain the yoke in its position of shift shown in Figure 3. During this operation it is assumed that there is no current flow through either solenoid. Upon energizing the solenoid 273 to produce a strong magnetomotive force a sufficient pull will be developed by such solenoid on the magnetizable block 271 to pull said block and the block 270 free of the holding force exerted by the Alnico block 277, and immediately the yoke will be drawn towards the right far enough to engage the Alnico block 278 with the magnetizable block 271. Having done this, such Alnico block 278 will retain the yoke in its newly shifted position without need of further energization of the solenoid. Accordingly the current may now be shut off from such solenoid 273 leaving the parts locked in their new position.

It is noted that the downward extensions 268 and 269 are formed of somewhat flexible springy steel or the like, so that they may flex slightly to permit the Alnico blocks to come into full contact with the magnetizable blocks 270 and 271, or vice versa, after the sleeve has completed its necessary shift to produce either braking action or driving action as the case may be.

The impulses of current needed to excite the solenoids are delivered to such solenoids by the microswitch contacts or the contacts of the switch by which delivery of the impulses to the clutch are controlled. Various signalling arrangements incorporating these switching features are disclosed in Letters Patent, No. 2,671,346 issued to me March 9, 1954 and in said parent application, Serial No. 502,947, Patent No. 2,856,692, of which case this application is a division. Thus it is not deemed necessary to describe them in detail here. However, it is now noted that the form of clutch now being described includes in its elements contacts by which the currents sent to the solenoids 272 and 273 are cut off prior to completion of the full actuating movements so that the yoke's movements are produced by the desired current impulses without need of sustaining such currents. To this end, the flexible leaf 285 is connected to the lower portion of the downward extension comprising the thin plates 268 and 269, such connection including the insulating elements 286 and 287. The blocks of insulating material 288 and 289 are supported by the floor of the frame of the switch and clutch. Studs 290 and 291 are extended through these insulating blocks; and the contacts 292 and 293 are carried by the inner ends of the studs. The lower ends of the leaf 285 carries complementary contact elements 294 and 295. By setting the studs back and forth in the insulating blocks to correct positions of adjustment it is possible to bring about contacting functions which will produce the desired circuit opening and closing operations. These operations include the following:

With the parts in the positions shown in Figure 3 the contacts 294 and 292 being engaged, a circuit is established which includes the solenoid 273, and, for example, the micro-switch stationary contact for one of the positions of the control microswitch. On the assumption that said microswitch was at the time in that positon so that its stationary contact corresponding to the contact 292 was not in engagement with the leaf contact of such microswitch, it is evident that the solenoid 273 would remain energized so that the clutch would remain in the position shown in Figure 3. Then, as soon as the microswitch was caused to reverse its leaf contact its stationary contact in connection with the solenoid 273 would be engaged, thus closing the circuit through such solenoid 273 and immediately reversing the clutch position. Shortly after commencing the clutch reversal the leaf 285 (see Figure 3) would carry the contact 294 away from the contact 292, thus opening the circuit of the solenoid, notwithstanding that the control microswitch might remain in its then position for a long time. Such opening of the circuit for the solenoid 273 should occur at a time when the leaf and yoke had moved substantially half way to their new positions, and where the force of the Alnico block 278 would be large enough to complete the throwing movement, and to bring the magnetizable block 271 into engagement with the Alnico block 278 to thus retain the yoke and connected parts in their shifted positions. But it is noted that during these operations the contact 295 carried by the leaf 285 will come into engagement with the contact 293 in good time to thus establish a partial circuit of which the solenoid 272, the opposite contact of the microswitch controlling the operations, and the contacts 295 and 293 thus brought together would comprise portions. This circuit would, however, not be completed until reversal of the leaf contact of the control microswitch, so that the clutch reversing operation would be delayed until such control microswitch should reverse its position. When such control microswitch reversal should afterwards occur the clutch of Figure 3 would reverse its position, with change of its contacts in harmony with the principles of operation just explained.

The Alnico or other permanent magnet arrangement above described will serve to ensure retention of the yoke in its shifted position and under the degree of force developed by the design of the parts. In case it should be desired to produce further holding effects than those due to the Alnico magnets, spring toggle elements may be provided which are as follows:

The yoke 255 is shown in Figure 4 as being provided with the heels 296 and 297 to which are connected the downwardly extending stiff pins or rods 298 and 299. Accordingly these rods will rock or swing as pendulums during the rocks of the yoke, such pendulum movements of the rods being executed about the horizontal axis through the pins 261 and 262 in Figure 4. Secured to the base portion of the unit and directly beneath the aforesaid axis of rock are the two upwardly extending pins 300 and 301 which are adjustably secured to the brackets 302 and 303. The proximate ends of the rods 298 and 299, and of the pins 300 and 301 are provided with abutments between which the compression springs 304 and 305 are contained. During rock of the yoke in either direction the rods 298 and 299 will swing through their lines of registry with the corresponding pins, the springs being compressed as the rods approach such registry, and such registry points being "dead-center" positions. Having passed such dead-center positions the springs will exert their expanding forces to complete the swing of the yoke, and to retain the sleeve and its connected parts in their shifted positions. By adjustment of the pins 300 and 301 it is possible to produce the desired spring force effects, taking into account also the characteristics of the springs.

Examination of Figure 3 will show that the plugs 281 and 282 are formed of non-magnetic material. Also that the plates 268 and 269 are connected to the central portion of the yoke 255 by a block of non-magnetic material 306. These nonmagnetic carriers ensure protection of drainage of magnetic effects through "short circuits," and thus assure production of the maximum magnetic moving and holding effects possible. Conveniently, the element 306 comprises a portion of the yoke 255 in which case said yoke comprises non-magnetic material in its entirety.

It is noted that in Figures 1 and 3 the driving shaft is shown at the right and the driven shaft at the left.

I claim:

1. In a clutch, the combination of aligned input and output shafts, means to journal said shafts in alignment with each other and with their proximate ends adjacent to each other, a driving element secured to the end portion of the input shaft and provided with a driving surface facing towards the output shaft, a stationary brake abutment adjacent to the output shaft and provided with a braking surface facing towards the input shaft, an engaging element mounted on the output shaft between the drive element of the input shaft and the stationary brake abutment and axially movable on the output shaft between a first defined driving position and a second defined braked position and drivingly connected to said output shaft during such axial movement thereon, said engaging element including a driven surface facing the driving surface of the drive element and proximate to said driving surface, and including a braking surface facing the braking surface of the stationary brake abutment and proximate to said stationary brake abutment surface, the engaging element being movable on the output shaft between the first defined driving position wherein its driven surface is in driving engagement with the driving surface of the drive element with its braking surface non-engaged with the braking surface of the stationary brake abutment, and the second defined braked position wherein its braking surface is engaged with the braking surface of the stationary brake abutment and with its driven surface non-engaged with the driving surface of the drive element, together with means to shift said engaging element between said first defined and second defined positions, said means including a pair of solenoids having their exciting coils mounted substantially in axial alignment with each other and separated axially from each other to provide an armature space between said coils, an armature comprising a block of magnetic material located in said space, means to movably mount said armature in said space, said means permitting movement of the armature towards one solenoid coil to a first defined armature position and permitting movement of the armature towards the other solenoid coil to a second defined armature position, and including operative connection between said armature and the engaging element constituted to shift the engaging element to its first defined driving position when the armature shifts to its first defined armature position and to shift the engaging element to its second defined braked position when the armature shifts to its second defined position, together with a permanent magnet corresponding to each solenoid and proximate to that end of such solenoid towards which the armature moves when the coil of such solenoid is energized, in position for magnetic engagement with the armature when such armature moves towards such solenoid.

2. A device as defined in claim 1, together with stationary contact elements corresponding to the two solenoids, movable contact elements in connection with the armature and movable therewith and constituted to engage the stationary contacts selectively according to location of the armature in said first defined armature position or said second defined armature position, said movable contacts engaging one stationary contact when the armature is in said first defined position and non-engaging the other stationary contact when the armature is in such position, and engaging the said other stationary contact when the armature is in said second defined position and non-engaging the first mentioned stationary contact when the armature is in such position, and the connections which deliver current to the solenoid coils selectively including the stationary contacts, the stationary contact which is engaged by the movable contacts when the armature is in its first defined position connecting to the solenoid to which the armature moves to its second defined position, and the stationary contact which is engaged by the movable contacts when the armature is in its second defined position connecting to the solenoid to which the armature moves to its first defined position.

3. A device as defined in claim 2, wherein the movable contacts non-engage with each stationary contact prior to full movement of the armature to its terminus of movement in each direction and wherein such movable contacts engage with each stationary contact not later than movement of the armature to its terminus of movement in such direction.

4. A device as defined in claim 3, wherein the armature is magnetically retained in each terminal position of its movement by the permanent magnet corresponding to such terminal position of movement.

5. A device as defined in claim 1, together with means to support each permanent magnet in its position proximate to that end of the solenoid towards which the armature moves when the coil of such solenoid is energized, including means to adjust the position of such permanent magnet in direction towards or away from the armature, to thereby adjust the position of such permanent magnet for engagement by the armature during movement of the armature towards the solenoid corresponding to such permanent magnet.

6. A device as defined in claim 1, wherein the operative connections between the armature and the engaging element include a flexible lever arm, connections between one end of said flexible arm and the engaging element, and connections between the other end of said arm and the armature, said flexible arm permitting yield thereof for engagement of the armature with either permanent magnet after engagement of the driven surface thereof with the driving surface of the drive element or after engagement of the braking surface thereof with the stationary brake abutment surface.

7. A device as defined in claim 6, wherein said lever arm comprises a force magnifying element from the armature to the driven surface of the engaging element and from the armature to the braking surface of the engaging element.

References Cited in the file of this patent
UNITED STATES PATENTS

| | | |
|---|---|---|
| 1,222,720 | Bijur | Apr. 17, 1917 |
| 1,853,225 | Rae | Apr. 12, 1932 |
| 1,883,163 | Van Voorhis | Oct. 18, 1932 |
| 2,424,306 | Denault | July 22, 1947 |
| 2,825,823 | Woodcock | Mar. 4, 1958 |